Dec. 8, 1931.　　　　　L. ISGUR　　　　　1,835,779
GLAZED STRUCTURE
Filed May 6, 1930
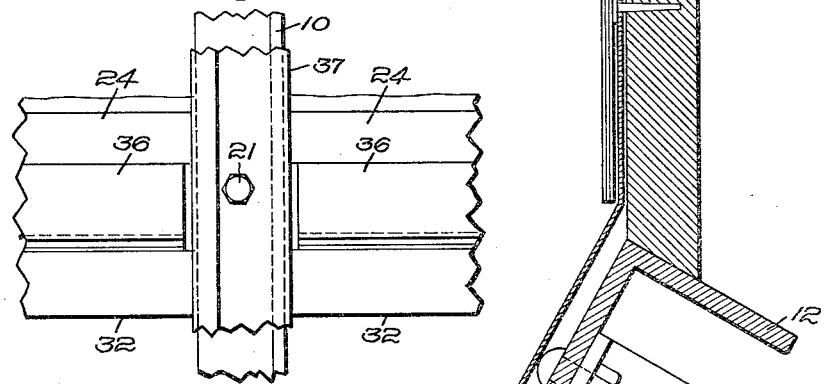
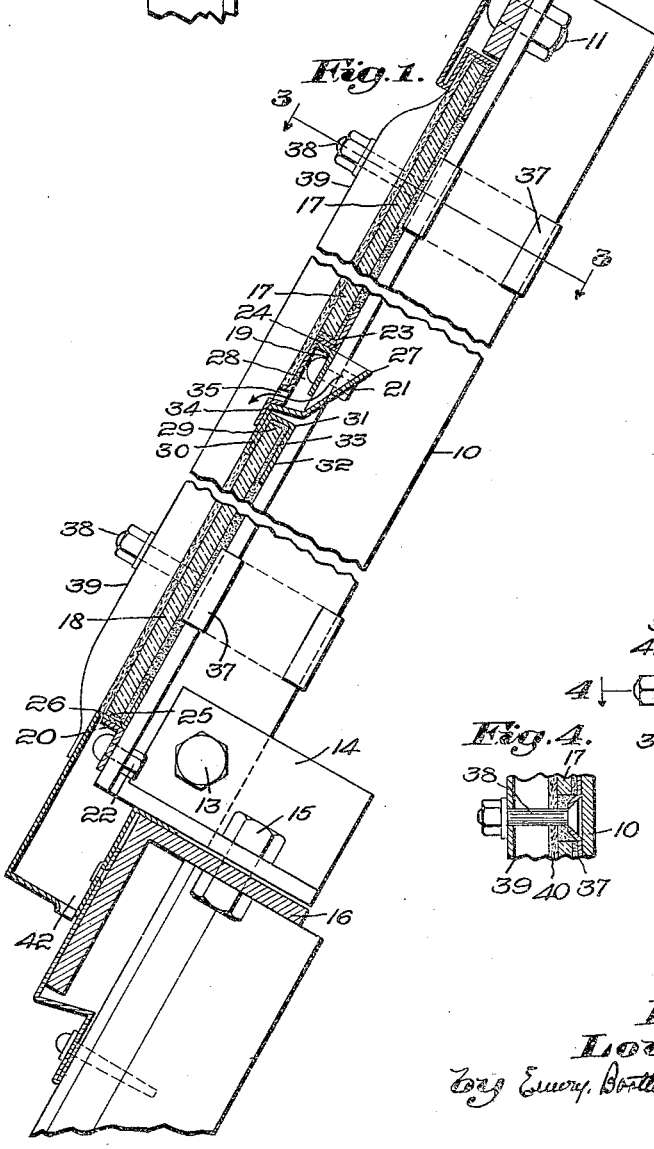
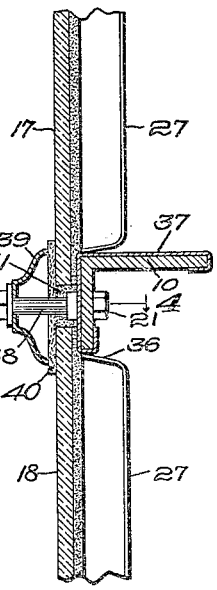
Inventor:
Louis Isgur,
by Emery, Booth, Varney & Townsend
Attys Patented Dec. 8, 1931

1,835,779

UNITED STATES PATENT OFFICE

LOUIS ISGUR, OF ROXBURY, BOSTON, MASSACHUSETTS, ASSIGNOR TO E. VAN NOORDEN COMPANY, OF BOSTON, MASSACHUSETTS, A CORPORATION OF MASSACHUSETTS

GLAZED STRUCTURE

Application filed May 6, 1930. Serial No. 450,145.

This invention relates to a novel gutter construction for glazed structures, such as skylights, and in particular saw-toothed roofs, in which the glazing is disposed at a rather steep angle.

The invention will be best understood by reference to the following description, when taken in connection with the accompanying drawings of one specific embodiment thereof, while its scope will be more particularly pointed out in the appended claims.

In the drawings:—

Fig. 1 is a vertical, sectional view of the glazed structure of a saw-tooth roof;

Fig. 2 is an elevation of a portion of the glazed structure, as viewed from the inner side in the direction of the arrow 2 in Fig. 1;

Fig. 3 is a sectional view on line 3—3 of Fig. 1; and

Fig. 4 is a sectional view on line 4—4 of Fig. 3.

Referring to the drawings, and to the embodiment of the invention which is illustrated therein, there is shown in Fig. 1 a portion of a saw-tooth roof, comprising a plurality of rafters, herein angle bars 10, suitably secured at their upper ends, as by bolts 11, to a head, herein an angle bar 12, and at their lower ends by bolts 13 to brackets 14, which in turn are secured, as by bolts 15, to a sill which, as shown, comprises an angle bar 16. Upper and lower glass members 17 and 18 are supported on the rafters by small, horizontal angle bars 19 and 20, respectively, which are suitably secured, as by bolts 21 and 22, to the rafters. The lower edge of the upper glass member is bedded in suitable material, such as putty 23, in a rabbet strip 24 resting on the angle bar 19, and the lower edge of the lower glass member 18 is similarly bedded in putty 25 in a rabbet 26, which rests upon the angle bar 20.

To catch the water of condensation which runs down the inner face of the upper glass member, I have provided a gutter 27 of novel construction and arrangement. This gutter is conveniently made of sheet metal, such as copper, and extends from the inner side of the glazing through a space 28 between the upper and lower glass members to the exterior, where it overlaps the upper edge of the glass member 18, as at 29. The sheet is then bent upwardly, as at 30, then inwardly as at 31, across the upper edge of the lower glass member 18, and then downwardly as at 32 along the inner face of the member 18, to form a groove which receives the upper edge of said member, and the latter is bedded in putty 33. The rabbet strip 24 spans the space 28 between the two edges of the glass members, and has its lower margin 34 overlapping the flange 29 of the gutter member. Water of condensation which collects in the gutter is discharged through one or more openings 35 provided in the rabbet 24, and runs down on the outer face of the lower glass member 18. Referring now to Fig. 3, where the rafters 10 cross the gutter member, the latter is squeezed inwardly as at 36, and is clamped between the glass members and the rafters.

The glass members are suitably secured to the rafters, as by saddles 37, bolts 38 and a cap 39, the latter resting upon a strip 40, such as saturated felt, which covers a space 41 between the vertical edges of the glass members. The remainder of the structure has no necessary connection with my invention, and requires no description.

Heretofore, in the use of glazed structures of this class, difficulty has been experienced owing to the fact that water of condensation would run down on the upper glass member, until it reached the upper edge of the first rabbet, and would then drop into the room below. In accordance with my invention, this is avoided by placing just below the lower edge of the upper glass member a gutter 27, which catches the water and conducts it through the space between the glass members to the exterior, where it runs down the outer face of the lower glass member. The condensation which runs down the inner face of the lower glass member passes out through one or more condensation openings 42 in the usual manner.

Having thus described one embodiment of the invention, but without limiting myself thereto, what I claim and desire by Letters Patent to secure is:

1. In a structure of the class described, the combination of two sloping, glass members having opposed horizontal edges separated by a space, and a gutter to receive water of condensation from the inner face of the upper glass member and to discharge the same through said space between said edges to the outer face.

2. In a structure of the class described, the combination of two sloping, glass members having opposed horizontal edges separated by a space, means between said edges to support the upper glass member, and a gutter to receive water of condensation from the inner face of the upper glass member and to discharge the same between said means and the upper edge of the lower glass member to the outer face of the latter.

3. In a structure of the class described, the combination of two sloping, glass members having horizontal edges separated by a space, a horizontal bar between said edges and extending along the lower horizontal edge of the upper glass member to support the upper glass member, a sloping bar extending across said edges to support said horizontal bar, and a horizontal gutter to receive water of condensation from the inner face of the upper glass member and to discharge the same below said horizontal bar and between said edges onto the outer face of the lower glass member.

4. In a structure of the class described, the combination of two sloping, glass members having horizontal edges separated by a space, and a horizontal gutter on the inner side of said members and having a part resting on the upper edge of the lower member, said gutter discharging between said edges onto the outer face of the lower member.

5. In a structure of the class described, the combination of two sloping, glass members having horizontal edges separated by a space, and a horizontal gutter on the inner side of said members and having a part resting upon the upper edge and overlapping the outer face of the lower member, said gutter discharging between said edges onto the outer face of the lower member.

6. In a structure of the class described, the combination of two sloping glass members having horizontal edges separated by a space, a horizontal gutter on the inner side of said members and having a part offset outwardly from the inside to the outside and overlapping the lower member, and a rabbet spanning said space above said offset part and having an opening through which said gutter discharges above said offset part onto the outer face of the lower member.

7. In a structure of the class described, the combination of a plurality of glass members, one above another, edge to edge and means to conduct water of condensation from the inner face of one glass member between said edges onto the outer face of a glass member therebelow.

8. In a structure of the class described, the combination of a plurality of glass members, one above another, and separated by a space, a rabbet which spans said space and is provided with an opening leading from said space to the exterior, and a gutter which collects water of condensation from the inner face of the upper glass member and discharges the water through said opening across the upper edge of the lower glass member onto the outer face of the glass member therebelow.

9. In a structure of the class described, the combination of a plurality of glass members, one above another, and having adjacent, horizontal edges separated by a space, and a gutter member presenting a gutter on the inner side of the structure and discharging through said space onto the outer face of the lower glass member, said gutter member presenting also a groove which receives the upper edge of the lower glass member.

10. In a structure of the class described, the combination of a plurality of glass members, one above another, and having adjacent, horizontal edges separated by a space, a gutter member presenting a gutter on the inner side of the structure and discharging through said space onto the outer face of the lower glass member, said gutter member presenting also a groove which receives the upper edge of the lower glass member, and a rabbet member extending from the inner face of the upper glass member beneath the lower edge of such member and thence downwardly across said space and overlapping a portion of said gutter member, said rabbet member being provided with an opening through which the water is discharged.

In testimony whereof, I have signed my name to this specification.

LOUIS ISGUR.